United States Patent
Draper et al.

(10) Patent No.: US 11,616,578 B2
(45) Date of Patent: Mar. 28, 2023

(54) ADJUSTING EYE HEIGHTS AND OPTICAL POWER LEVELS OF A MULTI-LEVEL OPTICAL SIGNAL

(71) Applicant: MACOM Technology Solutions Holdings, Inc., Lowell, MA (US)

(72) Inventors: Daniel Draper, Portland, OR (US); Merrick Brownlee, Hillsboro, OR (US)

(73) Assignee: MACOM Technology Solutions Holdings, Inc., Lowell, MA (US)

(*) Notice: Subject to any disclaimer, the term of this patent is extended or adjusted under 35 U.S.C. 154(b) by 0 days.

(21) Appl. No.: 17/402,169

(22) Filed: Aug. 13, 2021

(65) Prior Publication Data
US 2023/0045986 A1 Feb. 16, 2023

(51) Int. Cl.
H04B 10/524 (2013.01)
H04B 10/079 (2013.01)
H04B 10/2581 (2013.01)
H04B 10/50 (2013.01)

(52) U.S. Cl.
CPC ....... H04B 10/524 (2013.01); H04B 10/0795 (2013.01); H04B 10/2581 (2013.01); H04B 10/50572 (2013.01)

(58) Field of Classification Search
None
See application file for complete search history.

(56) References Cited

U.S. PATENT DOCUMENTS

| | | | |
|---|---|---|---|
| 9,184,841 B2 * | 11/2015 | Robinson | H04B 10/541 |
| 9,559,880 B1 | 1/2017 | Cirit et al. | |
| 9,660,730 B1 * | 5/2017 | Rope | H04B 10/07953 |
| 9,755,870 B1 * | 9/2017 | Cirit | H04B 10/541 |
| 10,014,950 B2 * | 7/2018 | Nagarajan | H04B 10/541 |
| 10,020,886 B2 * | 7/2018 | Castro | H04B 10/6163 |
| 10,038,575 B1 * | 7/2018 | Steffan | H04L 27/01 |
| 10,491,436 B1 * | 11/2019 | Lim | H03K 19/017545 |
| 10,547,387 B2 * | 1/2020 | Vegas-Olmos | G11B 5/09 |
| 10,720,995 B1 * | 7/2020 | Mazzini | H04L 25/4917 |
| 10,911,052 B2 * | 2/2021 | Littmann | H04L 25/4917 |
| 10,998,979 B1 * | 5/2021 | Parker | H04B 10/5161 |
| 11,070,288 B1 | 7/2021 | Guzzon et al. | |
| 11,101,890 B2 * | 8/2021 | Mazzini | H04B 10/2507 |
| 2013/0223849 A1 * | 8/2013 | Whiteaway | H04L 27/368 398/186 |
| 2016/0269121 A1 * | 9/2016 | Lee | H04B 10/524 |
| 2016/0363835 A1 * | 12/2016 | Nagarajan | G02F 1/225 |
| 2017/0346570 A1 * | 11/2017 | Teranishi | H04B 10/541 |
| 2018/0343064 A1 * | 11/2018 | Kawaai | H04B 10/588 |
| 2019/0068292 A1 * | 2/2019 | Zhu | H04B 10/693 |

(Continued)

FOREIGN PATENT DOCUMENTS

WO 2021127299 6/2021

*Primary Examiner* — Jai M Lee (57) ABSTRACT

A multi-level optical signal is sampled to generate an eye diagram. The signal can be adjusted when eyes in the eye diagram have different heights. More specifically, a first value is determined, and the height of a first eye is adjusted using the first value. The first value is multiplied by a stored factor to produce a second value, and the height of a second eye is adjusted using the second value, and so on for other eyes. As a result, eye heights are the same. Similarly, optical power levels of the signal can be adjusted when the levels are not equally spaced. As a result, the optical power levels are equally spaced.

19 Claims, 6 Drawing Sheets

(56) References Cited

U.S. PATENT DOCUMENTS

| | | | |
|---|---|---|---|
| 2020/0336212 A1* | 10/2020 | Yu | H04B 10/524 |
| 2021/0399799 A1* | 12/2021 | Guzzon | H04B 10/40 |
| 2022/0303018 A1* | 9/2022 | Ishikawa | H04B 10/2935 |

* cited by examiner

ADJUSTING EYE HEIGHTS AND OPTICAL POWER LEVELS OF A MULTI-LEVEL OPTICAL SIGNAL

BACKGROUND

There is an ever-increasing demand for more bandwidth in networks that communicate digital information. One way to help meet that demand is to use multi-level optical signaling. One type of multi-level optical signaling uses pulse-amplitude modulation (PAM), in which multiple transmission or optical power levels are used to communicate multiple bits (symbols) during each unit interval (UI) of time. For example, a PAM4 signaling scheme uses four optical power levels to transmit two-bit symbols (e.g., 00, 01, 10, and 11) per UI.

The optical power levels are preferably equally spaced from one another, and it is also preferable that the equal spacing be maintained over time. Linearity is a measure of the change in the spacing of the optical power levels, and a linearity value of one indicates perfect symmetry (spacing) between the levels over time. Generally speaking, equally spaced and linear power levels result in a well-defined signal that allows a receiver to more easily and accurately resolve the symbols in the signal.

The spacing of power levels can be monitored by, for example, repeatedly sampling a multi-level signal and displaying the results on an oscilloscope, where the vertical axis of the display represents the amplitude of the signal relative to the optical power levels, and the horizontal axis represents time. The displayed results are commonly referred to as an eye diagram.

Figure 1:
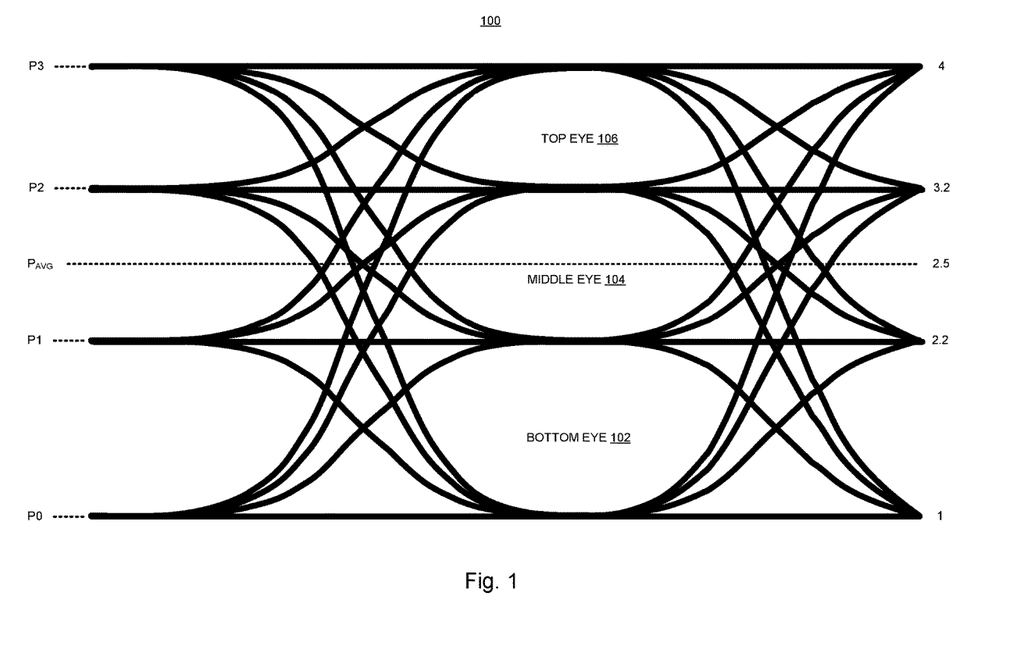
FIG. 1 is an example of an asymmetric eye diagram for a multi-level optical signal with unequal eye heights and uneven spacing of optical power levels.

FIG. 1 is an example of an eye diagram 100 for a PAM4 signal. The four optical power levels are labeled P0, P1, P2, and P3. The height (amplitude) of the "bottom" eye 102 is the difference between P0 and P1, the height of the "middle" eye 104 is the difference between P1 and P2, and the height of the "top" eye 106 is the difference between P2 and P3.

Multi-level optical signals are typically generated using some type of laser or other optical signal generator that is modulated by drivers. For a PAM4 signal, there are three drivers, one driver per pair of optical power levels (e.g., P0 and P1) or per eye.

A characteristic of lasers is that the light output may not be a linear function of electrical current or voltage. For example, the amount of light output can also be a function of operating temperature, which can vary over time. Laser slope efficiency is a measure of laser output (optical power) versus input power, and laser slope efficiency decreases as the operating temperature increases. Also, the laser threshold (e.g., the current at which lasing begins) is strongly affected by operating temperature. Therefore, generally speaking, the amount of light output by a laser can vary over time as a function of operating temperature. As such, the spacing between optical power levels (e.g., P0, P1, P2, and P3) and the eye heights corresponding to those power levels can also vary and so may not be equal, as illustrated in the example of FIG. 1. Unequal spacing and eye heights are reflected in the numbers on the right-hand side of the eye diagram 100, which are arbitrary measures of eye height starting from a base value of one.

In the example of FIG. 1, the height of the top eye 106 (the spacing between P2 and P3) is reduced relative to the height of the middle eye 104, while the height of the bottom eye 102 (the spacing between P0 and P1) is enlarged relative to the height of the middle eye. Thus, the top eye 106 requires more modulation by its respective driver so that its height will be the same as that of the middle eye 104. Similarly, the bottom eye 102 requires less modulation by its respective driver so that its height will be the same as that of the middle eye 104.

The top, middle, and bottom eye heights are typically adjusted independently of one another to achieve the desired eye height and linearity. This entails the use of three different sets of modulation output swing settings to compensate for the effects of changes in operating temperature as described above. The modulation output swing settings are stored in lookup tables (LUTs). Because the top, middle, and bottom eye heights are adjusted independently and there are three sets of settings, three LUTs are needed. This can increase memory storage requirements and/or computational overhead. Other conventional schemes that are used to independently adjust the top, middle, and bottom eye heights also have these types of disadvantages.

Thus, what is needed is a method and/or device that can be used to accurately adjust the eye heights and spacing between optical power levels of multi-level optical signals to maintain equal eye heights and equal spacing between optical power levels, considering that the optical output of lasers can change with time and temperature.

SUMMARY

Embodiments according to the present disclosure introduce methods (processes) and devices (circuits and systems) that address the disadvantages and satisfy the needs described above.

In embodiments, a multi-level optical signal (e.g., a multi-level pulse-amplitude modulation (PAM) signal) is generated with a source such as a laser or another type of optical signal generator. The multi-level optical signal is sampled to generate an eye diagram. The multi-level optical signal is adjusted when eyes in the eye diagram have different eye heights. More specifically, a first value is determined. For example, the first value can be determined by selecting it from a lookup table (LUT), or the first value can be determined based on a feedback signal that corresponds to a measure of the optical power of the light generated by the source (referred to herein as closed-loop modulation control). The height of a first eye of the multi-level optical signal is adjusted using the first value. The first value is multiplied by a stored factor to produce a second value, the height of a second eye of the multi-level optical signal is adjusted using the second value, and so on for any other eyes. As a result, the eye heights are the same.

Optical power levels of the optical signal are similarly adjusted when the optical power levels are not equally spaced. More specifically, a first value is determined (e.g., from an LUT or based on a feedback signal as mentioned above). The first value is multiplied by a stored factor to produce a second value. Spacing between a first pair of the optical power levels is adjusted using the first value, spacing between a second pair of the optical power levels is adjusted using the second value, and so on for any other pairs of optical power levels. As a result of those adjustments, the optical power levels are equally spaced.

In embodiments, the multi-level optical signal or PAM signal is a PAM4 signal. In such embodiments, the first value can be multiplied by a stored factor or factors to produce a value or values that can be used to adjust more than two eye heights or pairs of optical power levels. In other words, embodiments according to the present disclosure can be extended to implementations that use more than four optical power levels.

Embodiments according to the present disclosure thus eliminate the need for three LUTs, replacing them with a single LUT or with closed-loop modulation control (which does not require LUTs), thereby reducing memory storage requirements and computational overhead while still accurately adjusting the eye heights and spacing between optical power levels of multi-level optical signals and maintaining equal eye heights and equal spacing between optical power levels, even as the optical output of a laser or other optical signal generator varies with time and temperature.

Embodiments according to the present disclosure also simplify implementation of closed-loop modulation control, as the control loop only needs to adjust one eye height or one pair of optical power levels in response to a change in laser slope efficiency, because the other eye heights/optical power levels will be automatically scaled with that adjustment (using the stored factors as described above) to maintain linearity of the optical output of a laser or other optical signal generator.

These and other objects and advantages of the various embodiments of the invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "sampling," "receiving," "adjusting," "selecting," "multiplying," "modulating," "reading," "generating," "inputting," "providing," or the like, refer to actions and processes (e.g., the methods of FIGS. 4 and 5) of a circuit or device or system (e.g., the circuit or device or system of FIG. 2A or FIG. 2B).

The discussion below refers to "eye heights" and "optical power level spacing." It is understood that there is a relationship between these two terms, and in a sense these terms may be considered to be synonymous. Thus, instances in the following disclosure in which only eye height is discussed may be equally applicable to optical power levels, and vice versa.

Figure 2A:
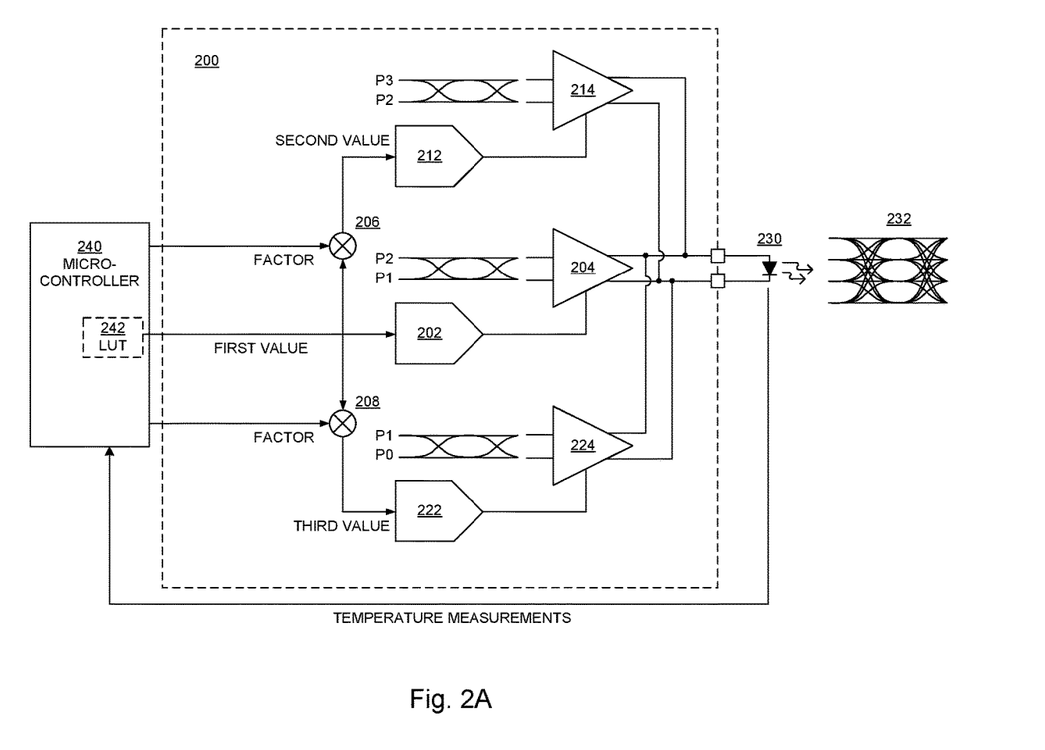
FIG. 2A is a block diagram illustrating selected elements of a circuit for modulating a source of a multi-level optical signal in embodiments according to the present disclosure.

FIG. 2A is a block diagram illustrating selected elements of a circuit (or system) 200 for modulating a source 230 of a multi-level optical signal 232 in embodiments according to the present disclosure. The circuit 200 can include elements or components in addition to those illustrated and described below, and the elements or components can be coupled as shown in the figure or in a different way. Some of the blocks may be described in terms of the function they perform. While described and illustrated as separate blocks, the present disclosure is not so limited; that is, for example, a combination of these blocks/functions can be integrated into a single block that performs multiple functions.

The multi-level optical signal 232 may be a pulse-amplitude modulation (PAM) signal, more specifically a Pulse-Amplitude Modulation 4-Level (PAM4) signal, and more generally a PAM signal having any number of optical power levels (e.g., more than four such levels).

In embodiments, the source 230 is, includes, or is coupled to a laser or other optical signal generator. In such embodiments, the source 230 can be, but is not limited to, an electro-absorption modulated laser (EML), a directly modulated laser (DML), a Mach-Zehnder (MZ) modulated laser, or a vertical-cavity surface-emitting laser (VCSEL). In operation, the source 230 produces the multi-level optical signal 232.

In the example of FIG. 2A, the circuit 200 is configured for a PAM4 signal. However, the present disclosure is not so limited. That is, the circuit 200 can be configured for signals that have more than four optical power levels, by adding one or more multipliers, digital-to-analog converters (DACs), and drivers, for example.

In the FIG. 2A embodiments, the circuit 200 includes a first DAC 202, a first driver 204 coupled to an output of the DAC 202, a second DAC 212, a second driver 214 coupled to an output of the DAC 212, a third DAC 222, and a third driver 224 coupled to an output of the DAC 222. DACs and laser drivers are known in the art.

Figure 3:
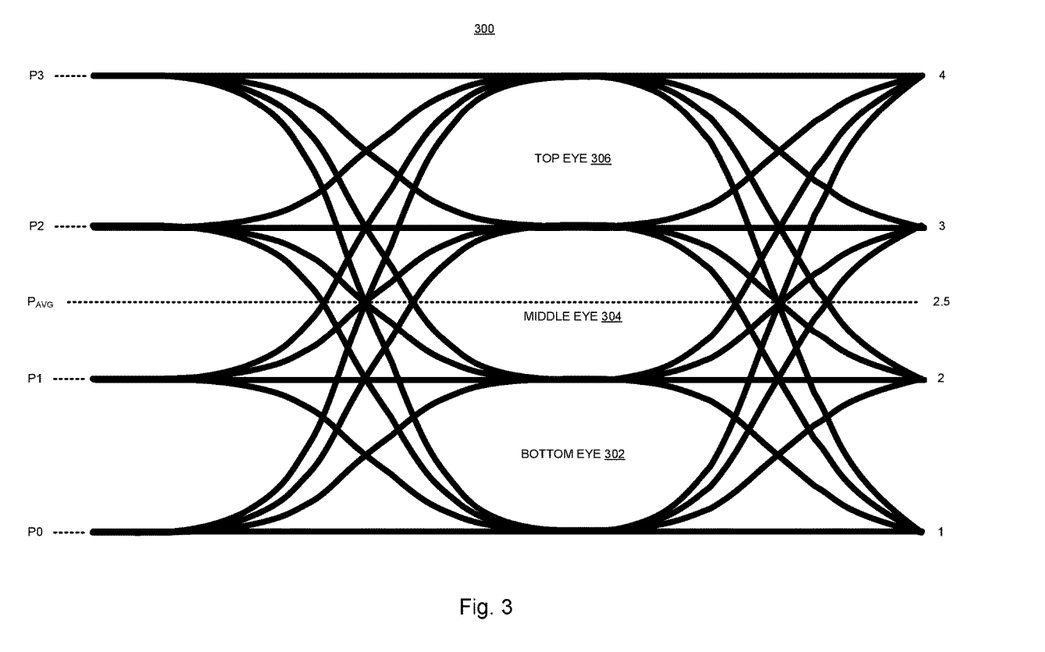
FIG. 3 is an example of a symmetric eye diagram for a multi-level optical signal with equal eye heights and optical power level spacing, resulting from adjustments made using the circuits of FIGS. 2A and 2B and the methods of FIGS. 4 and 5 in embodiments according to the present disclosure.

Each of the drivers 204, 214, and 224 is coupled to the source 230. Each DAC and driver pair may be referred to herein as a device or subcircuit. In general, each DAC and driver pair modulates an input (e.g., an amount of current or voltage) to the source 230, to adjust the height of an eye associated with that pair or to adjust the spacing between a corresponding pair of optical power levels. A pair of optical power levels refers to the minimum and maximum power levels of each of level of the multi-level optical signal (e.g., the levels P0 and P1 of FIG. 3 are a pair).

In the embodiments of FIG. 2A, the circuit 200 is coupled to a microcontroller 240 that includes, or is coupled to, a memory. In an embodiment, the memory is or includes a lookup table (LUT) 242. The LUT 242 includes a number of temperature-dependent values or inputs that are used to adjust or modulate the optical signal produced by the source 230, as will be described in further detail below. The values in the LUT 242 may also be referred to as modulation output swing settings.

In the example configuration of FIG. 2A, a value is selected and read from the LUT 242, and that value (which may be referred to herein as the first value) is input to one of the DACs 202, 212, or 222, and is also input to the multiplier 206 and to the multiplier 208. In the example of FIG. 2A, the first value is input to the DAC 202. Thus, in this example, the first value is input to the "middle" DAC, which is associated with adjusting the height of the middle eye of an eye diagram as will be described. However, embodiments according to the present disclosure are not so limited, and the circuit 200 can be configured to input the first value to the "top" DAC 212 associated with adjusting the top eye height, or to the "bottom" DAC 222 associated with adjusting the bottom eye height, depending on the configuration of the circuit 200.

In the example configuration of FIG. 2A, the multiplier 206 multiplies the selected (first) value by a predetermined and stored factor or ratio to produce a second value. Similarly, the multiplier 208 multiplies the first value by a predetermined and stored factor or ratio to produce a third value. The factor or ratio used by the multiplier 206, and the factor or ratio used by the multiplier 208, may have the same value or they may have different values. The value of each factor is determined as described below. The factor(s) may be stored in a register or registers of, for example, the microcontroller 240.

In essence, in the example of FIG. 2A, the factor used by the multiplier 206 is the ratio of the middle eye height to the top eye height when driven equally, and the factor used by the multiplier 208 is the ratio of the middle eye height to the bottom eye height when driven equally. Under ideal conditions, each ratio would have a value of one.

The factor or ratio used by the multiplier 206, and the factor or ratio used by the multiplier 208, can be determined and stored during setup or calibration of the circuit 200 and source 230, for example. The factor or factors can be determined by modulating the source 230 over a range of operating temperatures to determine temperature-dependent modulation output swing settings that achieve linearity for one of the eyes (e.g., the middle eye) of the multi-level optical signal 232 over time and temperature. Those settings/factors are stored in the LUT 242 as a function of temperature. Then, the other eyes (e.g., the top and bottom eyes) are scaled so that their eye heights are equal to the eye height of the middle eye. The amount of scaling per eye establishes the factor or factors used by the multipliers 206 and 208.

In operation, the DAC 202 receives the first value read from the LUT 242 and outputs an analog signal to the driver 204, and the driver 204 modulates the source 230 using the output of the DAC 202. The DAC 212 receives the second value from the multiplier 206 and outputs an analog signal to the driver 214, and the driver 214 modulates the source 230 using the output of the DAC 212. Similarly, the DAC 222 receives the third value from the multiplier 208 and outputs an analog signal to the driver 224, and the driver 224 modulates the source 230 using the output of the DAC 222. The drivers 204, 214, and 224 can modulate the source 230 based on current or on voltage.

Figure 2B:
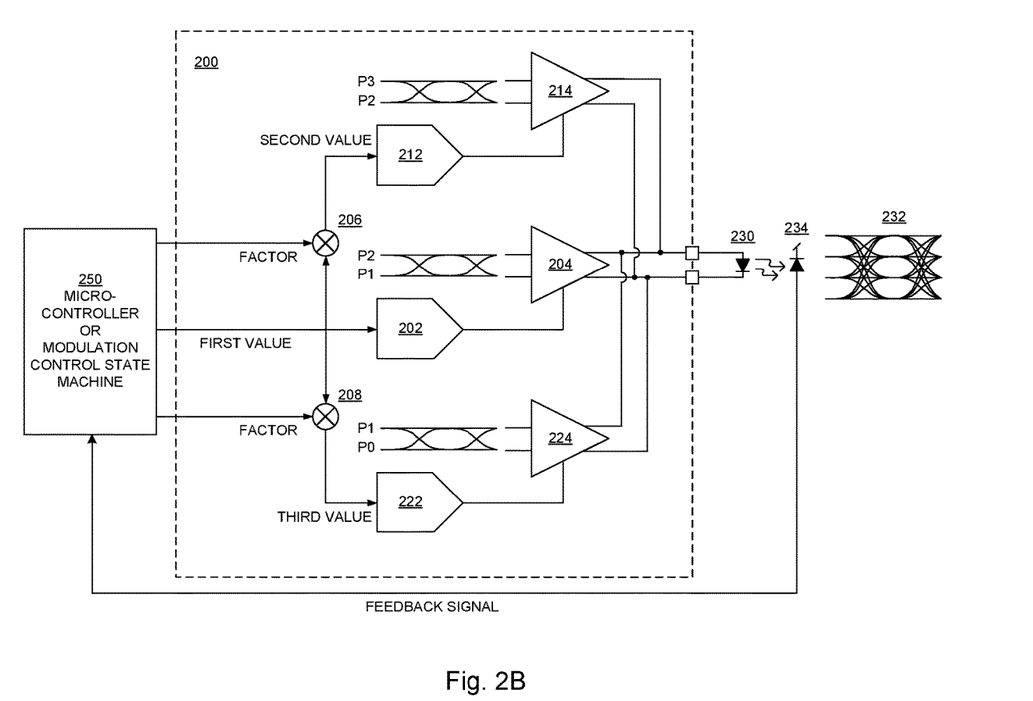
FIG. 2B is a block diagram illustrating selected elements of a circuit for modulating a source of a multi-level optical signal in embodiments according to the present disclosure.

FIG. 2B is a block diagram illustrating selected elements of the circuit 200 for modulating a source of a multi-level optical signal with closed-loop modulation control in embodiments according to the present disclosure. In the embodiments of FIG. 2B, the circuit 200 is coupled to a microcontroller or modulation control state machine 250 (hereinafter, the microcontroller 250).

In the FIG. 2B embodiments, a photodetector (e.g., a monitor photodiode 234) receives light generated by the source 230 and generates a feedback signal that is a measure of the optical power of the light. That is, the current or voltage level of the feedback signal corresponds to the optical power of the optical signal. The feedback signal can be converted to a digital signal by an analog-to-digital converter (not shown), and input to the microcontroller 250. The microcontroller 250 can compare the measure of optical power represented by the feedback signal to a stored value, and can determine the first value by adjusting the value that is being input to the DAC 202, based on the feedback signal (e.g., based on the difference between the measured value and the stored value). In general, with closed-loop modulation control of a laser, laser slope efficiency is sensed, and the modulation current or voltage is adjusted accordingly.

Once the first value is determined, the circuit of FIG. 2B functions like the circuit of FIG. 2A, at least to the extent described herein. Thus, embodiments according to the present disclosure can be used with an approach based on LUTs as described in conjunction with FIG. 2A, or with an approach based on closed-loop modulation control as described in conjunction with FIG. 2B. More generally speaking, embodiments according to the present disclosure can be used with compatible approaches for determining the first value, in addition to those described herein.

In the example of FIG. 2B, the microcontroller 250 is shown as being the source of the factors used by the multipliers 206 and 208; however, the present disclosure is not so limited, and those factors can be provided from another source (e.g., another microcontroller).

Thus, in embodiments according to the present disclosure, modulation output swing settings are needed for only a reference eye, because the settings for the other eyes are multiples of the settings for the reference eye. As such, only a single LUT is needed to store the modulation output swing settings, instead of the three LUTs needed in the conventional art. With closed-loop modulation control, no LUTs are needed. Consequently, embodiments according to the present disclosure reduce memory storage requirements, while still accurately adjusting the eye heights (and spacing between optical power levels) of multi-level optical signals and maintaining equal eye heights (and equal spacing between optical power levels) even as the optical output of a laser varies with time and temperature.

Also, setup and calibration are simplified, as only a single set of modulation output swing settings need to be written to and stored in the LUT 242. Furthermore, computational overhead during operation is reduced, because only the selected setting (the first value) needs to be written to a DAC, and it is written to only a single DAC (e.g., the DAC 202). In addition, operation of the circuit 200 is simplified, because it is not necessary to synchronize the DACs 202, 212, and 222; instead, the second and third values determined by the multipliers 206 and 208 are calculated automatically and input to the DACs 212 and 222 when the first value is determined and input to the DAC 202. Even if the aforementioned ratios are each equal to one, the disclosed invention still provides the above advantages.

In the discussion to follow, the middle eye (and associated optical power levels) may be described as the reference for adjusting the heights of the top and bottom eyes (and their associated optical power levels). However, as already noted, the present disclosure is not so limited, and any one of the other eyes can be chosen to be the reference at the time of setup and calibration and during subsequent operation, as long as the circuit 200 is configured accordingly.

Figure 4:
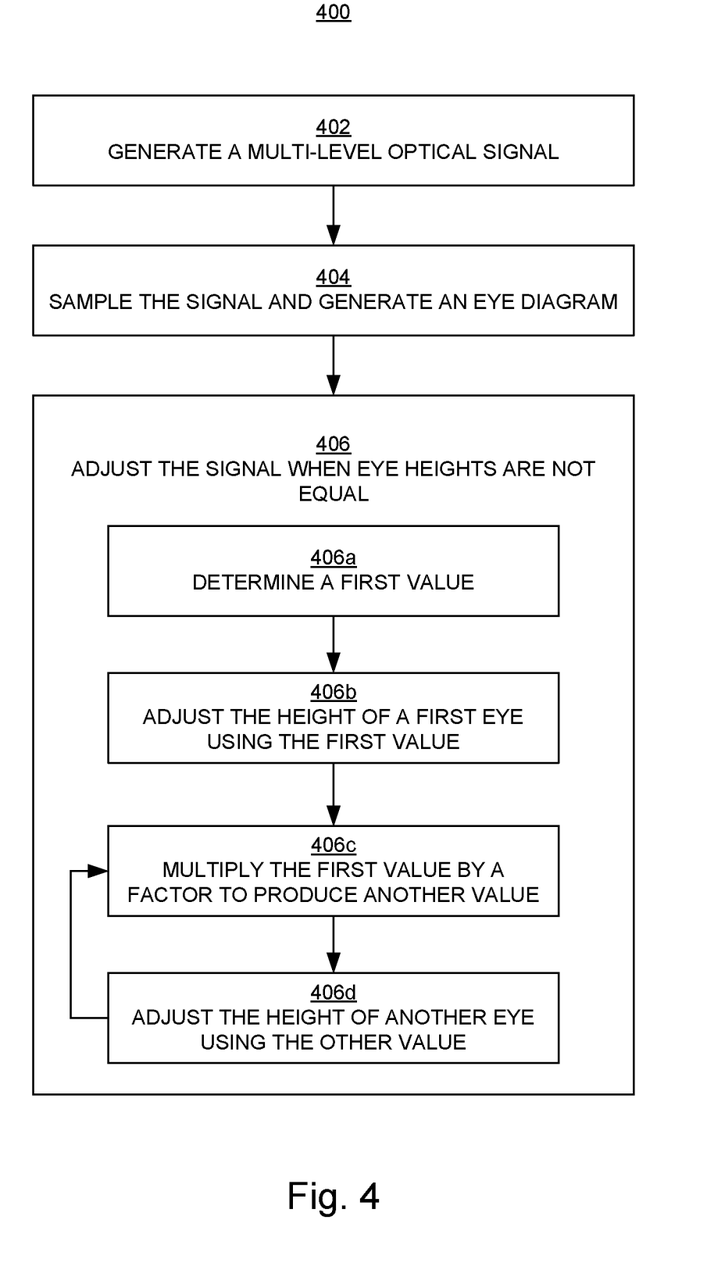
FIGS. 4 and 5 are flowcharts of methods for adjusting eye height and optical power level spacing of a multi-level optical signal in embodiments according to the present disclosure.
Figure 5:
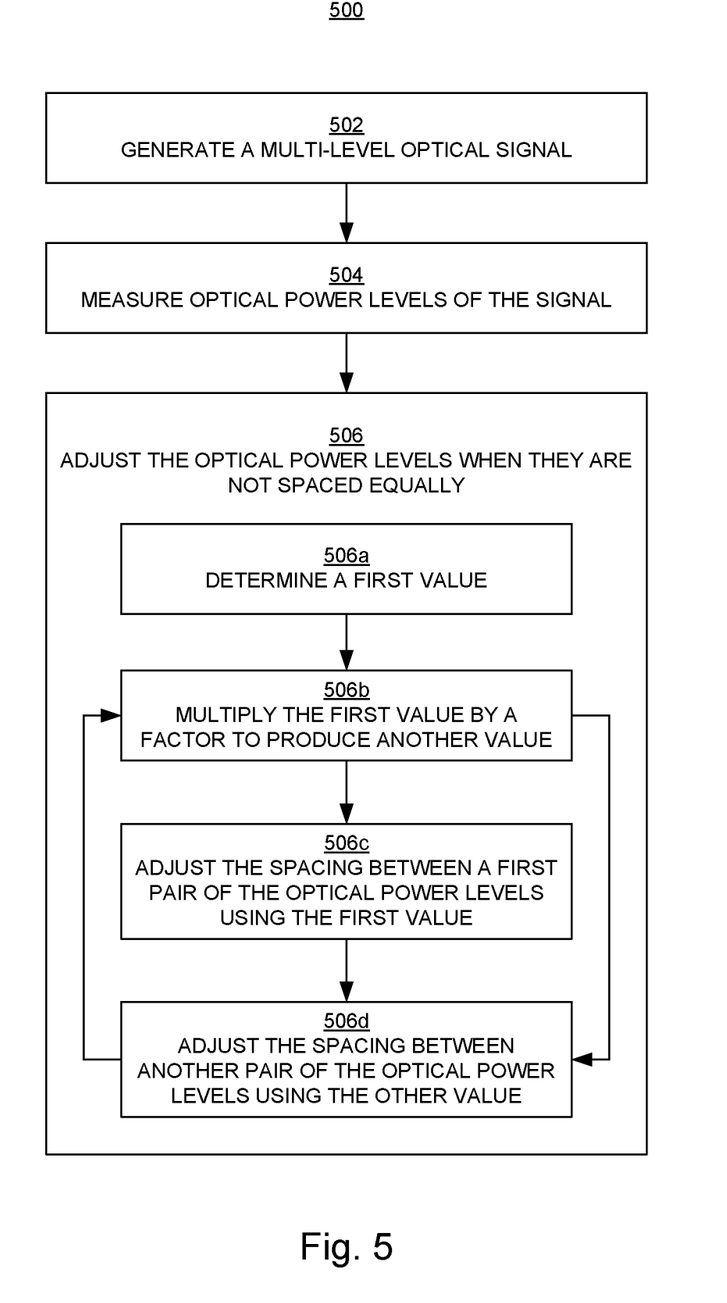

FIG. 3 is an example of an eye diagram 300 for a multi-level optical signal with equal eye heights and equal spacing of optical power levels, as a result of adjustments made according to the present disclosure, using the embodiments of FIGS. 2A and 2B, and the methods of FIGS. 4 and 5. The eye diagram 300 is for a PAM4 signal, and hence includes four optical power levels (P0, P1, P2, and P3) that define a bottom eye 302, a middle eye 304, and a top eye 306.

The numbers on the right-hand side of the eye diagram 300 are dimensionless measures of eye height and optical power level starting from a base value of one, demonstrating both equal heights of the eyes 302, 304, and 306 and equal spacing between the optical power levels P0, P1, P2, and P3.

FIGS. 4 and 5 are flowcharts 400 and 500 of methods for adjusting a multi-level optical signal in embodiments according to the present disclosure. All or some of the operations represented by the blocks in those flowcharts can be executed by, for example, the elements of FIG. 2A or of FIG. 2B. Methods for adjusting a multi-level optical signal according to the present disclosure can include operations in addition to those shown in the figures and described below. Also, the operations shown in the figures and described below may be performed in a different order than that presented.

In block 402 of FIG. 4, a multi-level optical signal (e.g., a multi-level PAM signal such as but not limited to a PAM4 signal) is generated with the source 230. In block 404, the multi-level signal is sampled to generate an eye diagram. In block 406, the multi-level signal is adjusted when eyes in the eye diagram have different eye heights.

In block 406a, a first value is determined (e.g., from the LUT 242 or with closed-loop modulation control). In block 406b, the height of a first eye (the middle eye in the examples of FIGS. 2A and 2B) of the multi-level optical signal is adjusted using the first value. More specifically, the first value is input to the DAC 202, the output of the DAC 202 is provided to the driver 204, and the driver 204 modulates an input (e.g., current or voltage) to the source 230.

In block 406c, the first value is multiplied (e.g., by the multiplier 206) by a stored factor to produce a second value. In block 406d, the height of a second eye (the top eye in the examples of FIGS. 2A and 2B) of the multi-level optical signal is adjusted using the second value. More specifically, the second value is input to the DAC 212, the output of the DAC 212 is provided to the driver 214, and the driver 214 modulates an input (e.g., current or voltage) to the source 230.

Blocks 406c and 406d can be repeated for a third eye (the bottom eye in the examples of FIGS. 2A and 2B) using the multiplier 208, a third value produced by that multiplier, the DAC 222, and the driver 224. In general, blocks 406c and 406d can be repeated for any practical number of eyes.

As a result of the operations just described, the height of the eyes in the eye diagram are equal or substantially equal.

In block 502 of FIG. 5, a multi-level optical signal (e.g., a multi-level PAM signal such as but not limited to a PAM4 signal) is generated with the source 230. In block 504, optical power levels produced by the source 230 are measured. Techniques for measuring output optical power are known in the art. In block 506, optical power levels of the optical signal are adjusted when the optical power levels are not equally spaced.

In block 506a, a first value is determined (e.g., from the LUT 242 or with closed-loop modulation control). In block 506b, the first value is multiplied (e.g., by the multiplier 206) by a stored factor to produce a second value.

In block 506c, spacing between a first pair of the optical power levels is adjusted using the first value. More specifically, the first value is input to the DAC 202, the output of the DAC 202 is provided to the driver 204, and the driver 204 modulates an input (e.g., current or voltage) to the source 230. In the examples of FIGS. 2A and 2B, the first pair of the optical power levels includes the levels associated with the middle eye (e.g., P1 and P2 of FIG. 3).

In block 506d, spacing between a second pair of the optical power levels is adjusted using the second value. In the examples of FIGS. 2A and 2B, the second pair of the optical power levels includes the levels associated with the top eye (e.g., P2 and P3 of FIG. 3). More specifically, the second value is input to the DAC 212, the output of the DAC 212 is provided to the driver 214, and the driver 214 modulates an input (e.g., current or voltage) to the source 230.

Blocks 506b and 506d can be repeated for a third pair of optical power levels (those associated with the bottom eye in the examples of FIGS. 2A and 2B; e.g., P0 and P1 of FIG. 3) using the multiplier 208, a third value produced by that multiplier, the DAC 222, and the driver 224. In general, blocks 506b and 506d can be repeated for any practical number of pairs of optical power levels.

As a result of the operations just described, the spacing between optical power levels is equal or substantially equal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of configurations. In addition, any disclosure of components contained within other components should be considered as examples because many other architectures can be implemented to achieve the same functionality.

Although the subject matter has been described in language specific to structural features and/or methodological acts, it is to be understood that the subject matter defined in this disclosure is not necessarily limited to the specific features or acts described above. Rather, the specific features and acts described above are disclosed as example forms of implementing this disclosure.

Embodiments according to the invention are thus described. While the present invention has been described in particular embodiments, the invention should not be construed as limited by such embodiments, but rather construed according to the following claims.

What is claimed is:

1. A method, comprising:
sampling a multi-level optical signal to generate an eye diagram;
adjusting the multi-level optical signal when eyes in the eye diagram have different eye heights, wherein said adjusting comprises:
determining a first value;
adjusting a height of a first eye of the multi-level optical signal using the first value including receiving the first value at a first digital-to-analog converter (DAC) and receiving an output of the first DAC at a first driver, wherein the first driver adjusts the height of the first eye by modulating an input to a source of the multi-level optical signal according to the output of the first DAC;
multiplying the first value by a stored factor to produce a second value; and
adjusting a height of a second eye of the multi-level optical signal using the second value including receiving the second value at a second DAC and receiving an output of the second DAC at a second driver, wherein the second driver adjusts the height of the second eye by modulating an input to the source of the multi-level optical signal according to the output of the second DAC.

2. The method of claim 1, wherein the multi-level optical signal comprises a Pulse-Amplitude Modulation 4-Level (PAM4) signal, and wherein the method further comprises:
multiplying the first value by a stored factor to produce a third value; and
adjusting a height of a third eye of the multi-level optical signal, using the third value.

3. The method of claim 1, further comprising generating the multi-level optical signal with a source selected from the group consisting of: an electro-absorption modulated laser; a directly modulated laser; a Mach-Zehnder modulated laser; and a vertical-cavity surface-emitting laser.

4. The method of claim 1, wherein each of said adjusting the height of the first eye and said adjusting the height of the second eye comprises modulating a current of a source of the multi-level optical signal.

5. The method of claim 1, wherein each of said adjusting the height of the first eye and said adjusting the height of the second eye comprises modulating a voltage of a source of the multi-level optical signal.

6. The method of claim 1, further comprising selecting the first value from a lookup table comprising a plurality of temperature-dependent values including the first value.

7. The method of claim 1, further comprising:
determining a measure of optical power level of the multi-level optical signal; and
using the measure to determine the first value.

8. A method, comprising:
generating a multi-level pulse-amplitude modulation (PAM) signal;
adjusting optical power levels of the PAM signal when the optical power levels are not equally spaced, wherein said adjusting comprises:
determining a first value;
multiplying the first value by a stored factor to produce a second value; and
adjusting spacing between a first pair of the optical power levels using the first value including inputting the first value to a first digital-to-analog converter (DAC) and providing an output of the first DAC to a first driver that modulates the PAM signal; and
adjusting spacing between a second pair of the optical power levels using the second value including inputting the second value to into a second DAC and providing an output of the second DAC to a second driver that modulates the PAM signal;
wherein the optical power levels of the first pair and the optical power levels of the second pair are equally spaced as a result of said adjusting the spacing between the first pair of optical power levels and said adjusting the spacing between the second pair of optical power levels.

9. The method of claim 8, wherein the PAM signal comprises a Pulse-Amplitude Modulation 4-Level (PAM4) signal, and wherein the method further comprises:
multiplying the first value by a stored factor to produce a third value; and
adjusting spacing between a third pair of the optical power levels using the third value.

10. The method of claim 8, wherein the PAM signal is generated by a source that is selected from the group consisting of: an electro-absorption modulated laser; a directly modulated laser; a Mach-Zehnder modulated laser; and a vertical-cavity surface-emitting laser.

11. The method of claim 8, wherein
the first and second drivers modulate a current of the source of the PAM signal.

12. The method of claim 8, wherein
the first and second drivers modulate a voltage of the source of the PAM signal.

13. The method of claim 8, further comprising selecting the first value from a lookup table comprising a plurality of temperature-dependent values including the first value.

14. The method of claim 8, further comprising:
determining a measure of optical power level of the multi-level optical signal; and
using the measure to determine the first value.

15. The circuit of claim 14, wherein the first device and the second device individually modulate an input to the source, wherein the input is selected from the group consisting of: a voltage input to the source; a current input to the source.

16. A circuit coupled to a source of a multi-level pulse-amplitude modulation (PAM) signal, the circuit comprising:
a plurality of devices comprising a first device and at least a second device, wherein the first device receives a first input that is selected when optical power levels of the PAM signal are not equally spaced; and
a multiplier coupled to the plurality of devices, wherein the multiplier multiplies the first input by a stored factor to produce a second input that is input to the second device, wherein the first device modulates an input to the source to adjust spacing between a first pair of optical power levels according to the first input, and wherein the second device modulates an input to the source to adjust spacing between a second pair of optical power levels according to the second input to equal the spacing between the first pair of optical power levels.

17. The circuit of claim 16, wherein the PAM signal comprises a Pulse-Amplitude Modulation 4-Level (PAM4) signal, wherein the plurality of devices further comprises a third device, wherein the first input is multiplied by a stored factor to produce a third input that is input to the third device, and wherein the third device modulates an input to the source to adjust spacing between a third pair of optical power levels according to the third input to equal the spacing between the first pair of optical power levels.

18. The circuit of claim 16, wherein the source is selected from the group consisting of: an electro-absorption modulated laser; a directly modulated laser; a Mach-Zehnder modulated laser; and a vertical-cavity surface-emitting laser.

19. The circuit of claim 16, wherein the first device comprises a first digital-to-analog converter (DAC) and a first driver that receives an output of the first DAC, and wherein the second device comprises a second DAC and a second driver that receives an output of the second DAC;
    wherein the first DAC receives the first input, and the first driver modulates the source using the output of the first DAC; and
    wherein the second DAC receives the second input, and the second driver modulates the source using the output of the second DAC.

\* \* \* \* \*